G. R. DEAN, DEC'D.
E. W. DEAN, ADMINISTRATRIX.
TEMPERATURE VALVE.
APPLICATION FILED FEB. 7, 1919.
1,412,845. Patented Apr. 18, 1922.
2 SHEETS—SHEET 1.
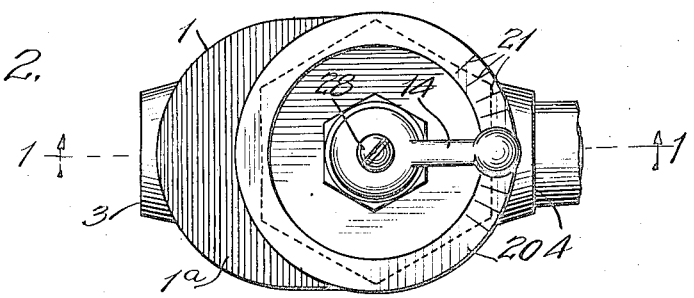
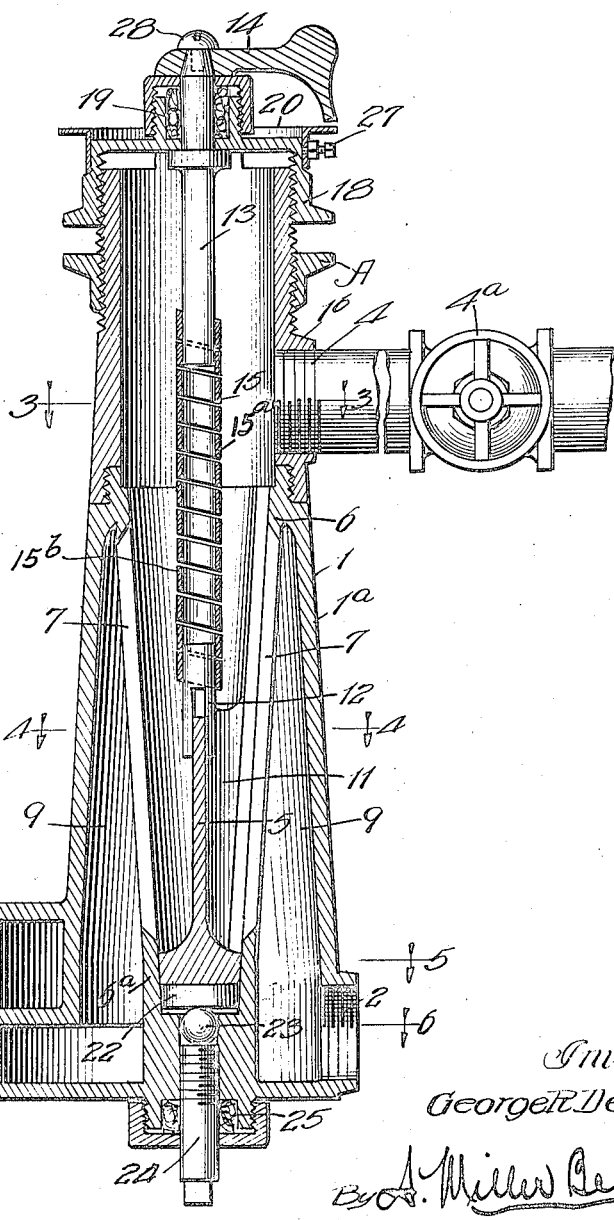
Witnesses:
W. F. Kilroy
Harry R. E. White.
Inventor:
George R. Dean,
by A. Miller Belfield
Atty.

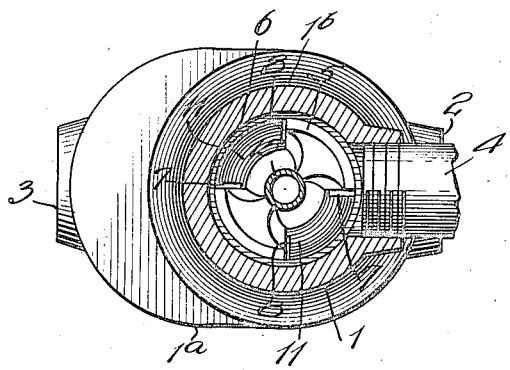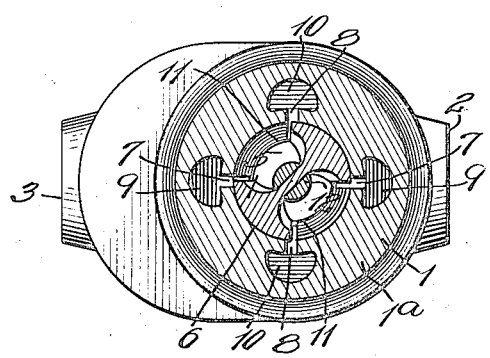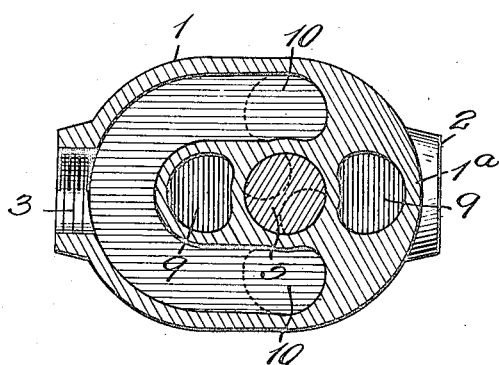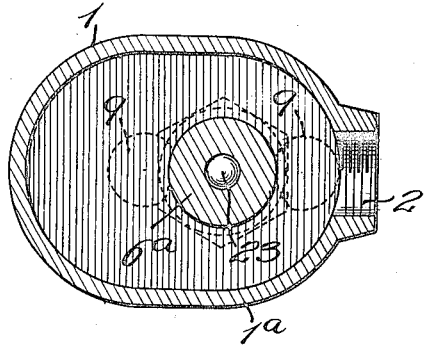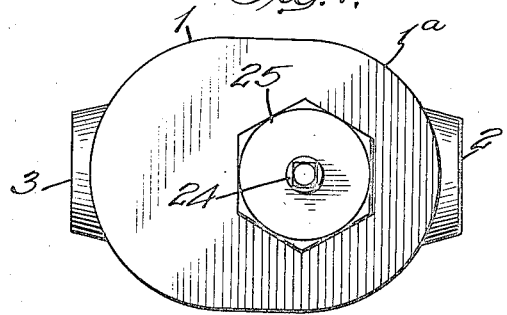

UNITED STATES PATENT OFFICE.

GEORGE R. DEAN, OF CHICAGO, ILLINOIS; EMILY WASHBURN DEAN ADMINISTRATRIX OF SAID GEORGE R. DEAN, DECEASED.

TEMPERATURE VALVE.

1,412,845.      Specification of Letters Patent.      Patented Apr. 18, 1922.

Application filed February 7, 1919. Serial No. 275,657.

*To all whom it may concern:*

Be it known that I, GEORGE R. DEAN, a citizen of the United States, residing at Chicago, in the county of Cook and State of Illinois, have invented a certain new and useful Improvement in Temperature Valves, of which the following is a full, clear, concise, and exact description, reference being had to the accompanying drawings, forming a part of this specification.

My invention relates to temperature valves for supplying a mixture of hot and cold water or other liquids.

The principal object of the invention is to provide a practical, effective and inexpensive temperature valve.

Another object of the invention is to arrange for the automatic regulation or control of the mixture, even though there may be variations in the pressure or temperature of either the hot or the cold water, or both.

Other objects of the invention are to accomplish the foregoing and other desirable results in a simple and expeditious manner.

In the accompanying drawings Fig. 1 is a longitudinal section of a temperature valve embodying my present invention, said section being taken on line 1—1 in Fig. 2;

Fig. 2 is a plan view of the device;

Figs. 3 to 6, inclusive are cross sections taken on lines 3—3, 4—4, 5—5 and 6—6 respectively in Fig. 1;

Fig. 7 is a bottom plan view of the device.

In the drawings I show a temperature valve having an exterior casing 1 of substantially circular cross section throughout the major portion of its length and of somewhat tapering form from top to bottom. At the bottom of the casing 1 is an inlet 2 which is preferably used for hot water and on the other side is another inlet 3 preferably used for cold water. There is also an outlet 4 which is for the escape of the mixture.

In the body of the casing 1 is a rotary valve 5 which fits within a conical shaped bore or housing 6 formed within the casing 1. The valve casing 6 is provided with longitudinally extending slots 7—7 and 8—8, whereof the slots 7—7 communicate with side chambers 9—9 which are connected with the hot water inlet 2, as shown by reference to Figs. 1, 4 and 5. The slots or valve apertures 8 are connected with chambers 10—10 which are connected with the cold water inlet 3, as shown by said Figs. 1, 4 and 5. Thus it will be seen that hot water will come in and be distributed through the ports 7—7 on opposite sides of the valve 5, and cold water will come in and be distributed through ports 8—8 also on opposite sides of the valve 5, but midway between the ports 7—7. Thus incoming pressure will be equalized in both hot and cold water.

The rotary valve 5 is provided with side chambers 11—11, into which water from the ports 7—7 and 8—8 enters. These side recesses or chambers communicate with the outlet opening or orifice 4 by which the mixture is discharged.

The valve 5 has a central stem 12 which is connected with a spindle 13 which extends up through the top of the casing 1 and is connected with a suitable handle 14 by which it may be turned. The connection between the valve stem 12 and the spindle 13 is preferably such as to permit the automatic adjustment of the valve with reference to varying pressure in either the hot or cold supply. The ends of the spirally wound member 15 may be fixedly connected to the valve stem 12 and spindle 13 by soldering. This causes the member 15 to twist and untwist when the temperature to which it is subjected is varied. Consequently there will be a twisting and untwisting movement, causing an adjustment of the valve 5 relatively to the spindle 13 when the temperature of the water in the device varies. The member 15 also acts as a spring to hold the valve 5 down against the bearing at the bottom.

The casing 1 is preferably made in two parts, a lower member $1^a$ and an upper member $1^b$, and the latter is preferably provided with an adjustable nut or collar 18, by which the upper end of the member $1^b$ may be closed. This member 18 also has a stuffing box 19 for the spindle 13. If desired a plate 20 may be provided and supplied with graduations 21 to indicate different temperatures, so that the handle 14 may be set to supply a temperature of any predetermined desired degree, either Fahrenheit or centigrade, according to the manner in which the plate 20 is marked.

At the bottom of the lower member $1^a$ the valve casing 6 is made in the shape of a socket $6^a$ to receive the lower end of the valve 5. A button 22 is arranged below the lower end of the valve 5 and this rests upon a ball 23 which in turn rests upon a spindle or stem 24 passing through a stuffing box 25. The spindle 24 is screw threaded as is also the bore in which it fits, so as to permit an adjustment of the ball 23, and thereby a vertical adjustment of the valve 5.

The object of the slots 7—7 and 8—8 is to get full capacity of the water and practical closing of the valve with only a very slight movement. The object in having the cold water come in on two opposite sides and the hot water also come in on two opposite sides is to get a balance of pressure on the valve 5 so that it will not bind against the side of the casing, thereby causing friction and making it difficult for the spiral 15 to operate.

The object of the ball 23 and button 22 is to reduce the friction and prevent wear in the members, which would change the adjustment of the valve. The ball and button may be made of glass or some other non-corrodible and hard material.

The movement of the valve is considerably more than the width of the slots 7—7 and 8—8 and thereby a more accurate adjustment of temperature may be obtained than if the valve merely opened and closed in the ordinary manner.

In the operation of the device the hot water is admitted at full capacity. This continues as the water gets hotter and as the valve swings around until the cold water begins to enter from the cold water port. The valve then adjusts itself to the temperature required. In case there is a change in temperature in the mixture due to a variation in the temperature or pressure of either the hot or cold water, this change in temperature would cause an automatic adjustment of the valve 5 through the medium of the member 15, and this adjustment will be such as to vary the size of the opening of the ports 7—7 and 8—8 to automatically restore the temperature at which the device has been operating and to which the handle 14 has been set. After the device has been used and the valve 4ª controlling the port 4 has been closed, the water in the chamber around the spiral 15 cools and the spiral thereupon turns backwardly closing off the cold water port and preventing the circulation of hot and cold water. This is a very substantial advantage. No matter at what position the indicator handle 14 is set, it is practically impossible for water to circulate through the device after the valve 4ª has been closed. Thus not only is there an automatic control of temperature while the device is in operation, but furthermore the device may be operated simply by opening and closing the valve 4ª, and this will automatically control the interior valve to permit and prevent circulation of water within the valve according as the device is open or closed.

The dial 20 is adjusted by means of a set screw 27 so as to permit adjustment of the dial according to temperatures which will be effected by adjustment of the handle 14. The pointer 14 is also adjustable by means of a set screw 28, so that no matter in what position the plumber leaves the valve the dial may be placed symmetrical with the plumbing fixture.

It will be understood that changes and modifications may be made without departing from the spirit of the invention.

What I claim is:

1. A device of the class specified comprising an outer casing provided with a plurality of inlets, a valve casing within said first mentioned casing, said valve casing having longitudinally extending slots affording communication with its interior, and a valve located within said casing and also having longitudinal slots and an operating connection adapted to automatically operate said valve upon a variation in temperature.

2. A device of the class specified comprising an outer casing provided with a plurality of outlets, a valve casing within said first mentioned casing, said valve casing having longitudinally extending slots affording communication with its interior, and a valve located within said casing and also having longitudinal slots and an operating connection adapted to automatically operate said valve upon a variation in temperature, said operating connection consisting of a spiral member adapted to twist and untwist according as the temperature varies.

3. A device of the class specified comprising an outer casing provided with oppositely disposed inlets, a valve casing located within said first mentioned casing and having longitudinally extending slots forming ports, said outer casing being provided with passages leading from said inlets to said ports, a valve located within said valve casing and having two chambers communicating with said ports, a spirally wound thermally responsive member connected with said valve, a spindle connected with said member, a handle connected with said spindle and an outlet for liquid mixed by said valve.

4. A device of the class specified comprising a casing having its lower end provided on opposite sides with inlets, one on each side, a valve casing within said first mentioned casing, said valve casing being provided with longitudinally extending slots forming ports, said first mentioned casing being provided with passages extending from said inlets to said ports, the ports for each inlet being arranged diametrically opposite one another, a spirally wound thermally responsive member connected with said valve, a spindle connected with the other end of said member, a handle connected with the other end of said spindle, a graduated dial for said handle, an adjustable bearing for said valve and an outlet from said casing above the valve chamber therein for discharging the liquid mixed by the valve.

5. A device of the class specified comprising in combination a housing provided with a plurality of inlets, a valve casing located within said housing, a rotary valve in said casing, said valve casing having oppositely disposed ports and there being passages from said inlets to said ports so that the pressure of incoming liquid upon said valve will be equalized, and a temperature sensitive device controlling said valve, said device comprising a spiral member having its axis coincidental with and adapted to rotate said valve and equally control both inlets upon the a variation in temperature.

6. A device of the class specified comprising a casing having its lower end provided with inlets, a valve casing located within said first mentioned casing and tapering downwardly, said valve casing being provided with slots communicating with the interior of said first mentioned casing, a valve located in said valve casing and tapering correspondingly with the same, an outlet above said valve and a device controlling said valve, said device comprising a spiral member adapted to rotate said valve upon a variation in temperature 7. A device of the class specified comprising a casing having its lower end provided with inlets, a valve casing located within said first mentioned casing and tapering downwardly, said valve casing being provided with slots communicating with the interior of said first mentioned casing, a valve located in said valve casing and tapering correspondingly with the same, an outlet above said valve and a device controlling said valve, said device comprising a spiral member adapted to rotate said valve upon a variation in temperature, and a ball bearing supporting the lower end of said valve.

In witness whereof, I hereunto subscribe my name this 16th day of December, A. D. 1918.

GEORGE R. DEAN.